United States Patent

Sudak et al.

[11] Patent Number: 5,375,805
[45] Date of Patent: Dec. 27, 1994

[54] POWERED CUP HOLDER

[75] Inventors: John A. Sudak, New Market, Canada; Norman K. Krol, Commerce Township, Oakland County, Mich.

[73] Assignee: Manchester Plastics, Troy, Mich.

[21] Appl. No.: 88,779

[22] Filed: Jul. 8, 1993

[51] Int. Cl.$^5$ ........................................... F16M 13/00
[52] U.S. Cl. .................................. 248/311.2; 248/550; 224/281; 297/188.17
[58] Field of Search .................. 248/311.2, 550, 298, 248/429; 297/194, 191, 188; 224/42, 45, 281

[56] References Cited

U.S. PATENT DOCUMENTS

| | | | |
|---|---|---|---|
| 216,203 | 6/1879 | Marx | 248/424 X |
| 2,555,716 | 6/1951 | Todhunter | 224/281 X |
| 4,402,482 | 9/1983 | Harbaugh et al. | 248/424 X |
| 4,494,806 | 1/1985 | Williams et al. | 224/281 X |
| 4,759,584 | 7/1988 | Dykstra et al. | 297/194 |
| 4,783,037 | 11/1988 | Flowerday | 248/311.2 |
| 4,838,511 | 6/1989 | Terada et al. | 248/429 |
| 4,852,932 | 8/1989 | Komeya et al. | 224/281 X |
| 4,981,277 | 1/1991 | Elwell | 248/311.2 |
| 5,007,610 | 4/1991 | Christiansen et al. | 248/311.2 |
| 5,060,899 | 10/1991 | Lorence et al. | 248/311.2 |
| 5,072,989 | 12/1991 | Spykerman et al. | 297/194 |
| 5,171,061 | 12/1992 | Marcusen | 297/194 |
| 5,228,611 | 7/1993 | Yabuya | 224/281 |

FOREIGN PATENT DOCUMENTS 0109754  4/1990  Japan ................. 224/281

Primary Examiner—Karen J. Chotkowski
Attorney, Agent, or Firm—Reising, Ethington, Barnard, Perry & Milton

[57] ABSTRACT

A stowable container holding assembly (10) for a vehicle. The assembly (10) includes a carrier (12) mounted in a vehicle support structure. A tray (18) having a container receptacle (22) is supported by and moveable with respect to the carrier (12). A motor (34) receives energy and converts it to motion. The motion is transmitted to the tray (18) and drives the tray (18) through an actuation assembly (32) between a retracted stowed position and an extended use position. The motor (34) is activated by a switch (48). Movement of the tray (18) is limited by a plurality limit switches (50). When the tray (18) is in the extended position, a lamp (62) is illuminated, and sensors (58) detect the presence of an object in the receptacles (22) and will not permit the tray (18) to return to the stowed position if an object is present. The tray (18) can be moved between the stowed and use positions manually in the event of power failure.

15 Claims, 2 Drawing Sheets

POWERED CUP HOLDER

TECHNICAL FIELD

The present invention relates to beverage container holding assemblies for use in motor vehicles, and particularly to powered cup holders which are moveable to a compact stowed position.

BACKGROUND ART

Beverage cup holder assemblies are common in today's vehicles. Many differing types of such beverage cup holders exist and they can be mounted in various positions within the vehicle. These cup holders are typically moveable between a stowed or concealed position and an extended or use position.

The manner in which cup holders are stored and moveable are quite varied. U.S. Pat. No. 5,171,061 to Marcusen discloses a cup holder slidable from a stowed concealed position to an extended use position. As the cup holder is extended to the use position, cup holder arms rotate outwardly to provide a container receptacle. Also, a T-shaped bail pivots downwardly to support the bottom the beverage container. U.S. Pat. No. 4,981,277 to Elwell discloses a similar type cup holder.

Another type of retractable beverage container is shown in U.S. Pat. No. 4,783,037 to Flowerday. Yet another type of cup holder is shown in U.S. Pat. No. 4,759,584 to Dykstra et al.

All of the aforementioned patents show a cup holder assembly of the type that is slidably mountable and can be extended from a stowed position to a use position. A different type of cup holder is the type disclosed in U.S. Pat. Nos. 5,072,989 and 5,007,610. In this type of cup holder assembly, the cup holder is pivotally mounted within the armrest of a vehicle.

All of the aforementioned types of devices require a manual movement to extend the cup holder to the use position. Such movement may be aided in only one direction in certain instances by a spring. That is, a spring can only help extend the cup holder to the extended position. No assembly is currently known which drives the tray fully in both directions between both of the extended use position and retracted stowed position. One further deficiency with these types of cup holders is that it sometimes becomes difficult for the operator of a vehicle to extend the cup holder to the use position while driving the vehicle.

SUMMARY OF THE INVENTION AND ADVANTAGES

According to the present invention, there is provided a stowable container holding assembly for a vehicle comprising a carrier for mounting in the vehicle. The assembly also includes a tray having at least one container receptacle supported by and moveable with respect to the carrier between a retracted stowed position and an extended use position. The assembly is characterized by tray movement means operatively associated with the tray and the carrier for receiving energy and converting the energy to mechanical motion to move the tray between the stowed and the use positions.

Accordingly, there is provided a power driven cup holder wherein a motor is used to drive a tray, which includes a container receptacle, in two directions between the stowed and use positions. Such power driven cup holders allow for ease of use by the operator, and smooth, efficient movement of the tray between both the stowed and use positions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
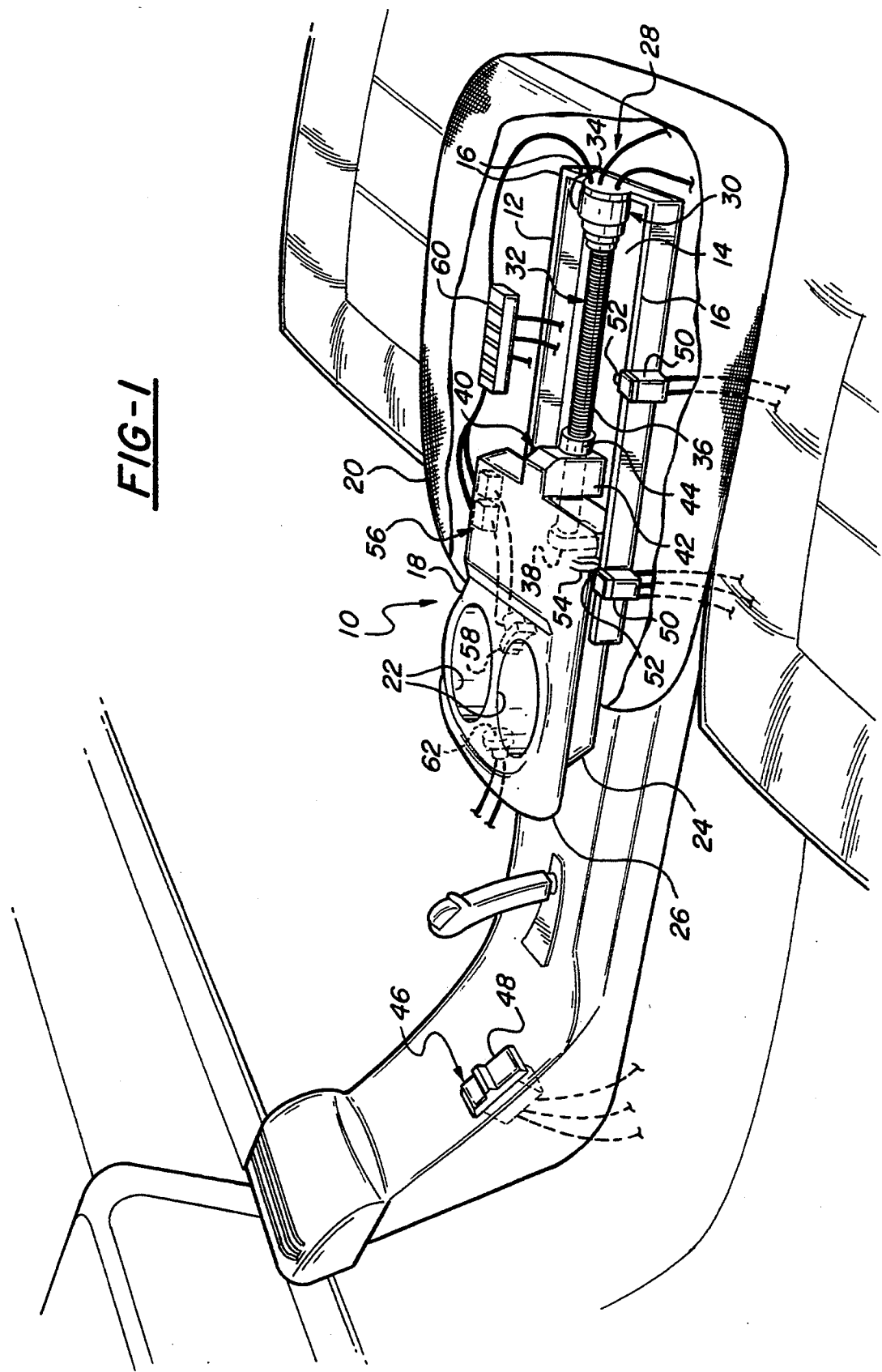
FIG. 1 is a perspective view of one embodiment of the present invention.

A stowable container holding assembly for use in a vehicle (not shown) is generally shown at 10 in the drawings. The assembly 10 includes a carrier 12 for mounting in the vehicle. The carrier 12 comprises a generally rectangular base 14 having a plurality of upstanding walls 16 fixedly secured thereto. Two of the upstanding walls 16 comprise a track for guiding movement of a tray 18. It will be appreciated that the carrier 12 may take any of a variety of other configurations. For example, the carrier 12 may be a rectangular box or housing having an open end for allowing movement of the tray 18. The primary purpose of the carrier 12 is to be mounted to the vehicle and to provide a guide for the tray 18.

Figure 2:
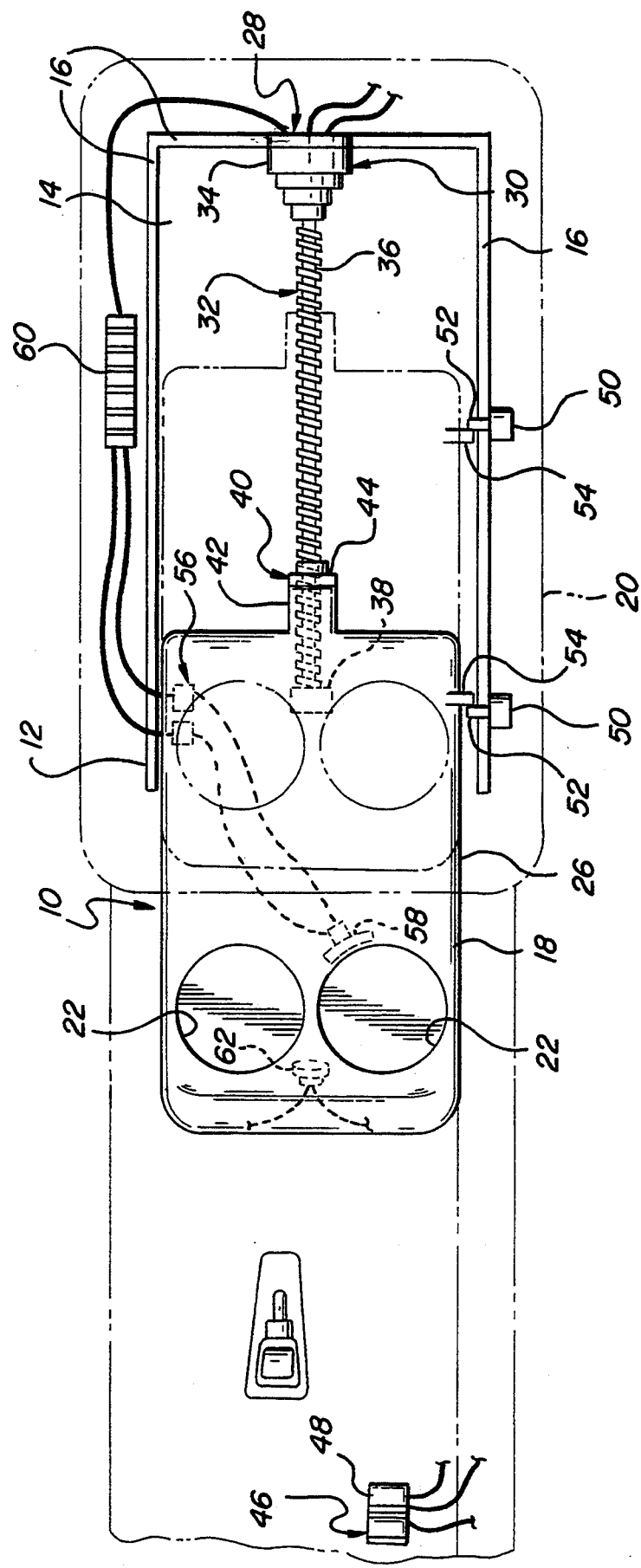
FIG. 2 is a plan view of the embodiment of FIG. 1.

As shown in FIGS. 1 and 2, the carrier 12 is horizontally mounted in a vehicle armrest assembly 20 that is typically located between the driver and passenger seats. It will be appreciated that the carrier 12 can be mounted in any suitable support structure in the vehicle, such as the instrument or dash panel for example. Further, the carrier 12 can be mounted vertically in certain environments.

The tray 18 includes at least one container receptacle 22. The tray 18 is supported by and moveable with respect to said carrier 12 between a retracted stowed position and an extended use position (as best shown in FIG. 2). More specifically, the tray includes a body 24 and an integral top 26. The body 24 is slidably disposed above the rectangular base 14 of the carrier 12. The top 26 extends outwardly from the body 24 to produce an upper flanged portion. The top 26, and more specifically, the upper flanged portion, engage a portion of the upstanding walls 16 of the carrier 12. The body 24 may also contact the walls 16. With the tray supported in this manner, movement of the tray 18 is guided by the carrier 12.

As previously stated, the tray 18 is moveable with respect to the carrier 12. The tray 18 can move between a stowed position shown in phantom in FIG. 2 and an extended use position shown in solid in FIG. 2. In the stowed position, the tray 18 substantially overlies the carrier 12 within the vehicle support structure, the armrest 20. The container receptacle 22 is, therefore, stowed behind the armrest 20 (or other vehicle support structure) and is concealed. The container receptacle 22 is not capable of being used in the stowed position. In the extended use position, at least a portion of the tray 18 extends outwardly from the carrier 12 and from the armrest 20. The container receptacle 22 is exposed in this position and is capable of being used.

In the preferred embodiment, the tray 18 moves linearly in the direction of the longitudinal axis of the carrier 12. It will be appreciated that the movement of the tray 18 between the extended and use positions my take place in any other manner. For example, the tray 18 may pivot or rotate, in any number of directions, from the retracted, stowed position wherein it overlies the carrier 12 to the extended use position. Or, movement of the tray may be a combination of linear and pivotal or rotational movements.

In the embodiment of FIGS. 1 and 2, the tray 18 includes two container receptacles 22. It will be appreciated that tray 18 and receptacles 22 may take any form. That is they may require rotation of arms (not shown) outwardly during movement of the tray 18 from the stowed to the use position (in any well known manner) to provide the receptacle 22 and may also include a bottom support (not shown) that extends outwardly during movement of the tray from the stowed position to the use position (in any well known manner). Thus, the container receptacle 22 may be formed in any manner and may take any shape and the tray 18 can be manipulated in any manner to provide a container receptacle 22 within the scope of the present invention.

In certain applications, the tray 18 may comprise only a support for forming the container receptacles 22. That is, the tray 18 may comprise arms for defining the container receptacle 22 and may also include a support for supporting the bottom of the container. In such a case, the arms (tray) and perhaps a base may move linearly from the carrier 12 or may rotate out of the carrier 12.

The assembly 10 also includes tray movement means generally indicated at 28. The tray movement means 28 is operatively associated with the tray 18 and the carrier 12 for receiving energy and converting the energy to mechanical motion to move the tray 18 between the stowed and the use positions. The tray movement means 28 reacts between the tray 18 and he carrier 12 in order to move the tray 18 relative to the housing.

More specifically, the tray movement means 28 comprises a motor means generally indicated at 30 and an actuator means generally indicated at 32. The motor means 30 is for receiving the energy and converting it to mechanical motion. The actuator means 32 is operatively associated with the motor means 30 and is for transmitting motion to the tray 18.

In the preferred embodiment the motor means 30 comprises a bi-directional direct current motor 34. The motor or power drive 34 is secured to one of the upstanding walls 16 of the carrier 12. The motor 34 receives electrical energy, from the vehicle electrical system, and substantially simultaneously converts the electrical energy into rotary motion. It will be appreciated that any type of motor or power drive device may be used to convert energy into mechanical motion. For example, a solenoid may be used, or a motor that is driven by fluid energy, such as a vacuum operated power drive may also be used to convert energy into mechanical motion within the scope of the present invention.

The actuator means 32 or assembly comprises a shaft 36. Preferably, the shaft 36 comprises a shaft having a helical thread thereon. One end of the threaded shaft 36 is connected to the output shaft of the motor 34. Thus, the threaded shaft 36 rotates in response to the rotary motion of the motor 34. The other end of the threaded shaft 36 is rotatably secured to the carrier 12. More specifically, a bearing (not shown) is supported in a bearing housing 38 that is secured to the rectangular base 14 of the carrier 12. The bearing has an opening for receiving the end of the threaded shaft 36 therein and allows the threaded shaft 36 to rotate relative to the bearing housing 38.

The tray 18 further includes receptacle means generally indicated at 40 fixedly secured thereto. The receptacle means 40 includes a downward projection 42 having an opening therethrough for receiving the helically threaded shaft 36. Further, a nut 44 is fixedly secured to the downward projection 42 and normally engages the helical thread of the shaft 36. The nut 44 cannot rotate relative to the tray 18. The downward projection 42 and nut 44 connection to the threaded shaft 36 allows the nut 44, and therefore the tray 18 to move along the helical thread of the shaft 36 as the shaft 36 rotates under influence of the motor 34. That is, because the nut 44 is fixedly secured to the downward projection 42, it does not rotate relative to the carrier 12. Rather, the shaft 36 rotates relative to the carrier 12 and causes movement of the nut 44, and therefore tray 18, linearly in the direction of the longitudinal axis of the shaft 36. Thus, movement of the motor in one direction causes the nut 44 and tray 18 to move from the stowed to the use position, and reversal of the motor causes the tray 18 to move from the extended use position to the retracted stowed position. In this manner, as the motor 34 rotates the shaft 36 relative the nut 44, the nut 44 moves longitudinally with respect to the shaft 36. This movement causes the tray 18 to move between the extended position and the stowed position.

Further, this arrangement allows for a ratchet system to be incorporated in which in the event of power loss the tray 18 can be manually moved. When this happens, the nut 44 is temporarily disengaged from the helical threads on the shaft 36 and the tray 18 can be manually pushed or pulled between the extended and stowed positions. To accomplish this, the nut 44 may be a half nut or a split spring clutch nut. In any event, the nut 44 must be disengageable from the threaded shaft 36 under manual influence. In such a case the nut 44 and projection 42 rachet along the shaft 36. This type of nut and rachet assembly is well known.

Thus, the nut 44 and rachet system of the receptacle means 40 engages the shaft 36 and travels along the helical thread thereof in response to rotary movement of the shaft 36 to thereby move the tray between the stowed and the use positions. With the use of this type of system the driving of the tray 18 by the motor 34 and actuator assembly 32 is independent of the position of the tray 18. That is, the motor 34 drives the tray 18 through the actuator assembly 32 under relatively constant force at all positions of the tray 18 relative to the carrier 12. This provides for smooth operation of the assembly 10. The nut and rachet system also allows for the tray 18 to be moved manually between the stowed and the use positions.

The assembly 10 further includes switch means generally indicated at 46. The switch means 46 is remote from the motor 34 of tray movement means 28. The switch means 46 is for selectively supplying energy to the motor 34 of the tray movement means 30 to control movement of the tray 18 between each of the stowed and the use positions.

More specifically, the switch means 46 comprises a momentary switch 48 for selectively providing energy to the motor 34. The switch 48 preferably includes three positions. The first position is the off or neutral position. The momentary switch 48 is biased to this first neutral position. The switch 48 can be activated by movement to one of the two other positions. The forward or second position is accomplished by moving the switch from the first neutral position to the second position and releasing it. When the switch is moved to the first position, the motor 34 receives energy and rotates the shaft 36 in one direction in order to drive the tray 18 from the stowed to the use position (from right to left as viewed in FIG. 2).

The third position of the momentary switch 48 allows the motor to be energized and rotates the shaft 36 in the opposite direction to drive the tray from the extended use position to the retracted stowed position (from left to right as viewed in FIG. 2).

While it is preferred that the momentary switch 48 comprise a "one touch" switch. That is, by moving the switch to any one of the second or third positions and releasing it, the full movement of the tray 18 between the use and stowed positions is effectuated, the momentary switch 48 may comprise a switch that requires the user to hold the switch in the desired position in order to effectuate proper movement of the tray 18 or, the switch 48 may comprise a combination of both of these types of switches. Such switches are commonly known. It will be appreciated that any switch 48 capable of selectively supplying energy to the motor 34 can be used within the scope of the present invention.

The motor means 30 also includes a plurality of limit switches 50 that de-energize the motor 34 when the tray 18 has reached either the stowed position or the extended position. More specifically, a pair of limit switches 50 are placed on one upstanding wall 16 of the carrier 12. The limit switches 50 are situated such that when they are activated only when the tray 18 is either in the fully extended position or in the fully retracted position.

The limit switches 50 each include a projection 52 which engage an outstanding flange 54 on the tray 18. The flange 54 engages the projection 52 on the limit switch 50 and the limit switch 50, in turn is activated to cut power to or de-energize the motor 34. In this manner, as the tray 18 reaches either the fully extended position, or fully retracted position, the flange 54 engages the projection 52 to de-energize the motor 34 and cease rotation of the shaft 36 to stop movement of the tray 18. By use of limit switches 50, movement of the tray 50 can be stopped in the proper predetermined locations.

After a limit switch 50 has been activated and in turn power is cut off form the motor 34, the tray 18 can no longer be moved in that direction. The tray 18 can only then be moved in the opposite direction by activating the momentary switch 48 to the opposite direction. Use of such limit switches are well known. Also, any other means to de-energize the motor 34 when the tray has rendered the fully extended or retracted positions can be used within scope of the present invention.

The assembly 10 further includes sensor means generally indicated at 56. The sensor means is for sensing when a container is in the receptacle 22. When a container is in the receptacle 22, the sensor means 56 prevents energy from being supplied to the motor 34 of motor means 30 to prohibit movement of the tray 18 by prohibiting movement of the motor 34. More specifically, sensor means 56 comprises an optical sensor 58 which can detect the presence of an object within the carrier receptacle 22. Once such an object is detected by the optical sensor 58, the sensor 58 produces a signal that prevents energization of the motor 34. In this manner, objects contained in the receptacle 22 preclude movement of the tray from the extended position to the stowed position. While only one such sensor 58 is shown, the assembly 10 may include one sensor for each receptacle 22. Any type sensor 58 capable of detecting the presence of an object can be used.

Each of the optical sensor 58, and limit switches 50 are electrically connected at the connector 60. The connector 60 is, in turn, electrically connected to the motor 34. The momentary switch 48 is preferably connected directly to the motor 34 but may also be connected to the motor 34 through the connector 60. In this manner, when the connector 60 receives a signal from any of the limit switches 50 or the sensor 58, it can preclude energization of the motor 34. That is once the limit switches 50 or sensor 58 is activated, energy is not supplied to the motor 34.

Also, the assembly includes a lamp 62 for illuminating the receptacle 22 when the tray is in the extended position. That is, as the tray moves to the extended position and contact of the flange 54 with the projection 52 on the forward limit switch 50 is made, the lamp 62 illuminates the container receptacle 22 making it easier for the operator to see the receptacle 22.

Operation of the assembly 10 is as follows. Initially, the tray 18 is in the retracted or stowed position and substantially overlies the carrier 12. The momentary switch 48 is moved from the neutral position to the second position and is released. This one touch operation energizes the motor 34 and the motor 34 receives electrical energy from the vehicle electrical system and converts it to rotary motion. The rotary motion is transmitted to the shaft 36. The shaft 36 rotates thereby causing movement of the nut 44 in the direction of the longitudinal axis of the shaft. This movement drives the tray 18 outwardly from the stowed position to the use position (from right to left as view in FIGS. 1 and 2). Movement of the tray continues until the flange 54 contacts the projection 52 on the forward limit switch 50. When this connection is made, the limit switch 50 is activated and de-energizes the motor 34. Simultaneously, lamp 62 is energized to illuminate the container receptacles 22.

To stow the cup holder assembly 10, the momentary switch 48 is moved to the third position and released. Movement of the switch 48 to the third position energizes the motor in the opposite direction (or reverses the motor) and causes the threaded shaft 36 to rotate in the opposite direction. This, in turn causes the nut 44 and therefore tray 18 to be driven inwardly of the armrest 20 (or other support structure) to move the tray 18 to the stowed position. That is, the tray moves from left to right as viewed in FIGS. 1 and 2. Movement of the tray 18 in this direction is limited by limit switch 50. That is, the tray 18 moves until flange 54 contacts projection 52 on the rearmost limit switch 50. When this contact is made, the limit switch 50 is activated and this de-energizes motor 34.

If an obstacle is present in the receptacle 22 when the tray 18 is in the use position, sensor 58 will detect its presence and preclude energization of the motor 34 and, therefore, movement of the tray 18.

In the event of power loss, the nut rachet assembly 44, 42 allows movement of the tray 18 by manual movement. That is, the nut 44 can be disengaged from the threaded shaft 36 by manually applying a force to the tray 18. The tray 18 can then be moved under manual force even though the shaft 36 does not rotate. In this manner, the tray 18 can be moved even in the event of power loss to the motor 34.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A stowable container holding assembly (10) for a vehicle comprising:

a carrier (12) for mounting in the vehicle;

a tray (18) having at least one container receptable (22) supported by and movable with respect to said carrier (12) between a retracted stowed position and an extended use position;

tray movement means (28) operatively associated with said tray (18) and said carrier (12) for receiving energy and converting said energy to mechanical motion to move said tray (18) between said stowed and said use positions;

switch means (46) remote from said tray movement means (28) for selectively supplying energy to said tray movement means (28) to thereby control movement of said tray (18) between each of said stowed and said use positions;

said tray movement means (28) comprising motor means (30) for receiving said energy in response to actuation of said switch means (46) and converting it to said mechanical motion and actuator means (32) operatively associated with said motor means (30) for transmitting said motion to said tray (18); and characterized by sensor means (56) for sensing when a container is in said receptacle (22) to thereby prevent energy from being supplied to said motor means (30) and thereby prohibit movement of said tray (18) by said motor means (30).

2. An assembly as set forth in claim 1 further characterized by said actuator means (32) comprising a shaft (36) connected to said motor means (30) and rotatably secured to said carrier (12), and receptacle means (40) fixedly disposed on said tray (18) for receiving said shaft (36) and for moving in response to rotary movement of said shaft (36).

3. An assembly as set forth in claim 2 further characterized by said motor means (30) comprising a bi-directional direct current motor (34) secured to said carrier (12) for receiving electrical energy and converting same into rotary motion.

4. An assembly as set forth in claim 3 further characterized by said shaft (36) having a helical thread thereon for disposition within said receptacle means (40).

5. An assembly as set forth in claim 4 further characterized by said receptacle means (40) comprising a nut and ratchet assembly (42, 44) for engaging said shaft (36) to travel along said helical thread in response to rotary movement thereof to thereby move said tray (18) between said stowed and said use positions and for allowing said tray (18) to be moved manually between said stowed and said use positions.

6. An assembly as set forth in claim 5 further characterized by said switch means (46) comprising a momentary switch (48) for selectively providing said energy to said motor (34).

7. An assembly as set forth in claim 1 further characterized by said motor means (30) including at least one limit switch (50) to de-energize said motor means (30) when said tray (18) has reached one of said stowed or said extended positions.

8. An assembly as set forth in claim 1 further characterized by said tray including a lamp (62) for illuminating said receptacle (22) when said tray (18) is in said extended position.

9. A stowable beverage container holding assembly (10) for a vehicle comprising:

a carrier (12) for mounting in the vehicle;

a tray (18) having at least one container receptacle mounted on and moveable with respect to said carrier (12) between a retracted stowed position and an extended use position;

a motor (34) for receiving a form of energy and converting it to mechanical motion;

a switch (48) remote from said motor (34) for selectively supplying energy to said motor (34);

an actuator (32) connected to said motor (34) for transmitting said motion to said tray (18) to thereby move said tray (18) between said stowed and said use positions;

said actuator (30) comprising a shaft (36) connected to said motor (34) and rotatably secured to said carrier (12), and a receptacle (40) fixedly disposed on said tray (18) for receiving said shaft (36) and for moving in response to rotary movement of said shaft (36); and characterized by a sensor (58) for sensing when a container is in said container receptacle (22) to thereby prevent energy from being supplied to said motor (34) and thereby prohibit movement of said tray (18) by said motor (34).

10. An assembly as set forth in claim 9 further characterized by said motor (34) comprising a bi-directional direct current motor (34) secured to said carrier (12) for receiving electrical energy and converting same into rotary motion.

11. An assembly as set forth in claim 10 further characterized by said shaft (36) having a helical thread thereon for disposition within said receptacle (40).

12. An assembly as set forth in claim 11 further characterized by said receptacle (40) comprising a nut and ratchet assembly (42, 44) for engaging said shaft (36) to travel along said helical thread in response to rotary movement thereof to thereby move said tray (18) between said stowed and said use positions and for allowing said tray (18) to be moved manually between said stowed and said use positions.

13. An assembly as set forth in claim 12 further characterized by said switch ( 48 ) comprising a momentary switch (48) for selectively providing said energy to said motor (34).

14. An assembly as set forth in claim 9 further characterized by including at least one limit switch (50) to de-energize said motor (34) when said tray (18) has reached one of said stowed or said extended positions.

15. An assembly as set forth in claim 9 further characterized by said tray (18) including a lamp (62) for illuminating said container receptacle (22) when said tray (18) is in said extended position.

* * * * *